United States Patent Office 3,309,299
Patented Mar. 14, 1967

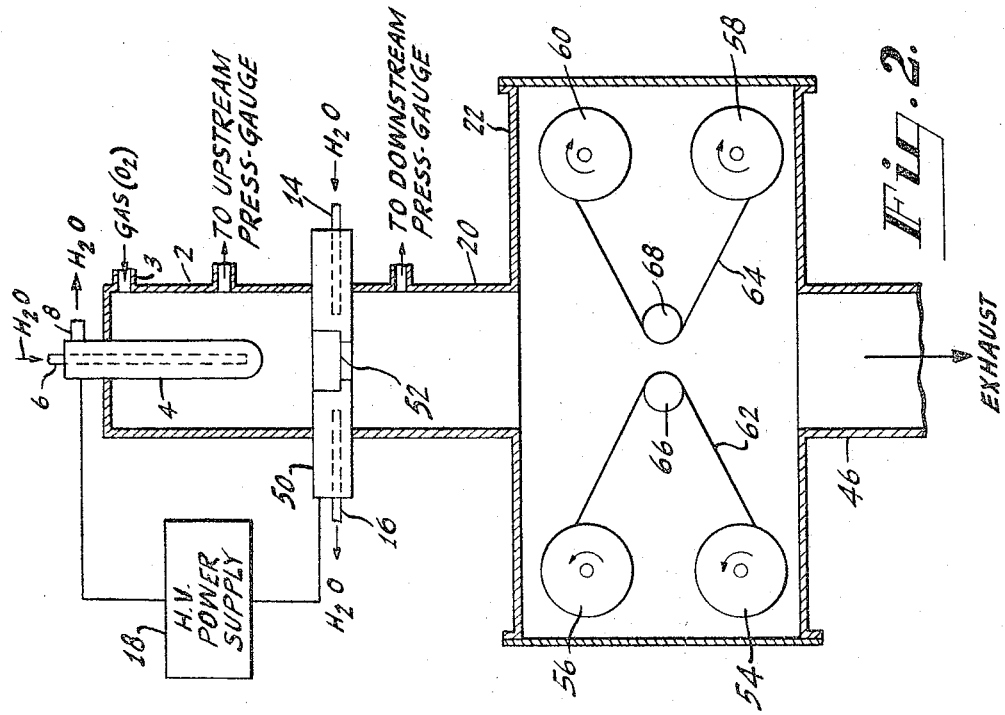
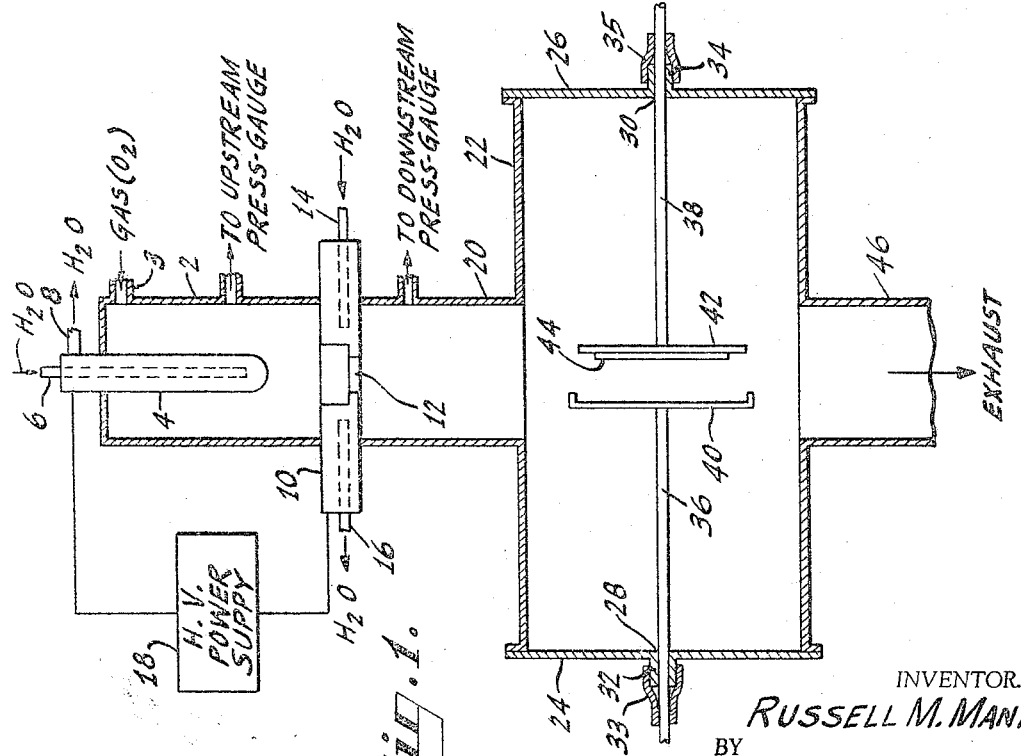

3,309,299
METHOD OF TREATING SYNTHETIC RESINOUS MATERIAL TO INCREASE THE WETTABILITY THEREOF
Russell M. Mantell, Princeton, N.J., assignor to Aerochem Research Laboratories, Inc., a corporation of Maryland
Filed Aug. 22, 1963, Ser. No. 303,733
9 Claims. (Cl. 204—165)

The present invention relates generally to an improved method of treating surfaces of materials, such as synthetic resinous materials, to render these surfaces more adherent to substances such as printing inks, paints, lacquers and glues. More particularly, it relates to a process which comprises treating these materials with monatomic gases.

It has long been recognized that surfaces of articles composed of substances such as the polyolefins, for example, are relatively non-polar and difficult to paint, print or laminate unless they are first treated or modified in some way. Paints, lacquers and printing inks do not adhere well to these surfaces and therefore tend to rub off and peel off easily in use. Since these organic polymers are otherwise highly suitable for manufacturing a large variety of objects, such as containers and packaging wraps, the plastics industry has been seeking to improve the surface properties of these plastics to facilitate the application of decorative designs and printed information to them.

Most previous methods of surface activating these plastics may be divided into chemical, thermal and corona discharge types.

Typical of chemical methods which have been tried are those employing chromic acid solutions, or a combination of ozone plus a hydrogen halide, or nitrous oxide. Some of the disadvantages of this type of process are that the physical properties of the treated surfaces are sometimes undesirably changed and it has been found difficult to remove all traces of the treating agents after the treating process has been completed. As a consequence of these shortcomings, the chemical treating methods have not found commercial acceptance to any appreciable extent.

Typical thermal methods have been those employing heated oxidizing gases, such as air, directed against the surface of the polymer while keeping the bulk of the body cold. In one form of this method, the gases are preheated. In another form, a direct flame is played upon the surface of the plastic.

The thermal type of process has been found difficult to control so as to treat large surface areas uniformly and it has been found particularly difficult to apply the process to the treatment of thin films without melting them.

In corona discharge types of treatment, the plastic is passed through an electrical discharge field at ordinary atmospheric pressure. In one form of this method, which has been used for treating plastic films, the film is passed over a rotating drum electrode while discharging a high-frequency alternating current to the drum from a knife-edge electrode through a narrow air gap.

The corona discharge type of treatment also has its disadvantages. The presence of small specks of dust or other contamination on the film leads to arcing between the electrodes and consequent puncturing of the film. Also, if the surface of the film or other object being treated is not almost perfectly flat, arcing also tends to result. Moreover, it is almost impossible to treat surfaces which are other than flat, thus making it impractical to treat plastic bottles, for example.

One object of the present invention is to provide an improved method of activating surfaces of certain materials, to render these surfaces more adherent to printing inks, lacquers, paints, and adhesives.

Another object of the invention is to provide an improved method of rendering the surfaces of plastics more receptive to substances such as printing inks, lacquers, paints and adhesives.

Another object of the invention is to provide an improved process of surface-activating non-polar synthetic resins that is applicable to objects having a wide variety of shapes.

A further object of the invention is to provide a readily controllable method of treating the surfaces of synthetic resins so that sheets of them may be more readily laminated.

A still further object of the invention is to provide an improved method of surface activating synthetic resinous fibers and cloths.

Briefly, one feature of the present invention comprises passing a polyatomic gas, such as oxygen or nitrogen, or gaseous mixtures including oxygen and nitrogen, such as air, into an electric discharge region such that the gas is at least partially dissociated into free atoms. A stream which includes the dissociated gas is caused to impinge upon the surface of the object being treated for a long enough period of time to activate the surface to a desired extent. After the activation treatment, the surface may have printing applied thereto, or it may be lacquered or painted, or glued, for example.

The invention will now be more specifically described with reference to the accompanying drawing of which:

FIG. 1 is a section view, partially schematic, of one form of apparatus suitable for carrying out the method of the invention, and FIG. 2 is a view similar to that of FIG. 1, of another embodiment of apparatus suitable for carrying out the method of the invention.

The method of the present invention may be distinguished from certain prior art methods in that the surface being activated is not subjected directly to the effects of an electrical discharge or of electrical particles, such as electrons. Instead, an electrical discharge is utilized to generate gaseous atoms and these atoms are caused to impinge upon the surface being treated. When the surface being treated is a non-polar hydrocarbon resin, a chemical change apparently occurs in a thin surface layer, as is evinced by a measurable loss of weight of the object being treated. And, in any case, regardless of the material being treated, the surface becomes modified in some manner not fully understood so that it is now more receptive to substances such as inks, lacqers, and adhesives; the wettability of said surface is increased.

Apparatus for creating an electrical discharge of a type found useful in carrying out the method of the invention is not, itself, the subject of this invention, but is more fully described in Patent No. 3,005,762, issued October 24, 1961, to John B. Fenn.

The Fenn Patent describes apparatus for forming discharges of the type known as "silent electrical discharges" and tells how to create a gaseous plasma which may be used for certain purposes. The discharges preferably utilized in the present invention are of the type characterized by relatively high voltage, relatively low current density, and a relatively low gas temperature. This type of discharge can be produced by connecting a pair of electrodes to the output terminals of an alternating or direct-current, high-voltage power supply. If relatively low current densities are employed, the electrodes may be thin sheets of platinum or other refractory metal with adequate cooling provided by heat of radiation. However, at higher current densities, copper electrodes are usually employed and a fluid is circulated through channels in the electrodes to obtain sufficient cooling.

In the present invention, it has been found suitable to employ a continuous direct current discharge of about 0.1 to 1.0 kilowatt between water-cooled copper electrodes. The discharge region may be maintained at subatmospheric pressure, 10 to 20 mm. mercury, for example, although this pressure may be varied considerably and may even be normal atmospheric or higher. A stream of gas, which may be air, oxygen or nitrogen is passed through the discharge and, immediately after being subjected to the discharge, is withdrawn through a nozzle and allowed to expand at supersonic speeds into a treating chamber. The treating chamber is maintained at a pressure which is preferably not more than one-half that of the discharge chamber. In the treating chamber, the surface of the object or film being treated is exposed to the gaseous stream.

Optimum time of exposure of the surface being treated to the stream of partially dissociated gas will, of course, vary greatly with such factors as strength of the electrical discharge employed to activate the gas, dimensions of the orifice between the discharge and treating chambers, the particular surface being treated and the area being treated. However, it has been found that surfaces of synthetic resins can be activated to a significant extent by one second or even a small fraction of a second exposure to the stream of activated gas. Some further increase in activation of the surface usually is found to occur with periods of exposure longer than the minimum but, for many purposes, a very brief exposure has been found to be sufficient.

Apparatus suitable for carrying out the method of the invention as a batch type process will now be described, referring first to FIG. 1 of the drawing.

As shown in FIG. 1, the apparatus may comprise a cylindrical discharge chamber 2, of thick-walled Pyrex glass, disposed vertically and mounted on a frame (not shown). Near the upper end of the discharge chamber is a gas inlet opening 3 which may be connected to any suitable source of gas (not shown). Sealed to the upper end of the discharge chamber, and extending downward into it, is a first discharge electrode 4 composed of a hollow copper cylinder having ports 6 and 8 for admitting and removing cooling fluid. Defining the bottom wall of the discharge chamber is a second discharge electrode 10 in the form of a hollow copper disc having a central opening 12 centered on the vertical axis of the discharge chamber directly beneath the lower end of the first discharge electrode 4. The second discharge electrode also has ports 14 and 16 for entrance and exit of cooling fluid.

The diameter of the opening 12, in the embodiment of the apparatus being described, was 5/8 inch and the discharge gap between the two electrodes was about 6 inches.

The discharge electrodes 4 and 10 are connected to a suitable conventional high voltage power supply 18.

Below the second discharge electrode 10 is an expansion chamber 20 made of the same thick-walled Pyrex tubing as the discharge chamber. The discharge chamber is sealed at its lower end to a horizontal treating chamber 22 also made of thick-walled Pyrex tubing. This chamber preferably has a diameter several times that of the discharge and expansion chambers.

The treating chamber has circular removable closure members 24 and 26 at its outer ends. Each of these members has a central opening of small diameter 28 and 30, respectively, provided with an exterior brass sleeve 32, 34, and holding metal rods 36 and 38, respectively, slidably mounted within the openings 28 and 30 and sealed air-tight to the sleeves 32 and 34 with flexible seals 33 and 35, of, for example, lubricated rubber.

Mounted on the inner end of the rod 36 is a circular metal sample shield 40 and similarly mounted on the other rod 38 is a circular copper sample holder 42 for holding samples 44.

Leading from the bottom end of the treating chamber is an exhaust duct 46 connected to a vacuum pump (not shown).

In carrying out the method of the present invention, the above-described apparatus is used to generate a continuous stream or jet of monatomic gas which is caused to impinge upon the surface being treated for a certain length of time until the desired result is obtained. In treating a plastic film, for example, a piece of the film is mounted on the face of the sample holder 42, the sample holder being temporarily removed from the apparatus for this purpose. Mounting may be done with any suitable adhesive. The closure member 26 of the treating chamber may be removed so that the sample can be changed whenever desired.

With the sample mounted on the sample-holder, and the rod 38 mounted in the sleeve 34, the closure member 26 is mounted back in position and the rod 38 is slidably adjusted to bring the sample holder near the center of the treating chamber as shown. The shield 40 is then manipulated by means of rod 36 so that the shield covers the sample. This is done so that the sample is covered until proper discharge conditions have been attained.

To bring the apparatus to operating condition, the interior is pumped down by a heavy duty vacuum pump connected through the exhaust duct 46. As an example, but not intending to be limiting in any way, pumping may be continued until the pressure in the treating and expansion chambers is about 5 mm. of mercury. If oxygen is to be the treating gas, a monitored flow of this gas is admitted to the discharge chamber through the opening 3.

It has been found convenient and desirable to adjust operating conditions so that the pressure in the discharge chamber is about twice that of the treating chamber. Pumping speed, rate of gas flow and nozzle opening 12 are adjusted to obtain this pressure ratio. Oxygen gas flow may, for example, be maintained at about $5 \times 10^{-3}$ moles per second. In the examples which follow, the same rate of gas flow was also maintained for air and nitrogen.

After steady state conditions have been established, the high voltage power supply is turned on and regulated so that a discharge current of 1 ampere at 1 kv. is established. The discharge may be started at lower amperage, say 0.1 ampere, and then brought up to operating strength, but this is not absolutely necessary. These conditions support a silent or flow type discharge between electrodes 4 and 10 and a substantial portion of the oxygen stream passing through the discharge is dissociated into atoms of oxygen. A typical amount of monatomic oxygen produced is about 2 to 3 mole percent of the oxygen admitted. A plasma jet is formed on the lower side of the nozzle opening 12 as the gas is expanded preferably at supersonic speed into the expansion chamber 20.

The apparatus is now ready for treating a sample of plastic and treating is accomplished by merely moving the shield 40 back away from the sample so that the sample is exposed to the stream of plasma. Effectiveness of the treatment depends, at least in part, on the concentration of monatomic oxygen in the treating stream.

Treating various material for even very brief periods of time has been found to so change the surface properties of the materials that they become more adherent to commercial printing inks and lacquers, for example, and they also adhere better to certain adhesives.

The method was tested by treating a large number of samples of plastic films and cloths with a stream of monatomic gas generated as described above, for varying periods of time from one second, and less, up to 15 minutes. Discharge conditions were also varied.

One of the materials treated, for testing purposes, was 1 mil thick polypropylene film. Samples of the treated film were coated with a printing ink, a commercial lacquer and a commercial india ink. For purposes of comparison, another group of samples of the same material was not exposed to the monatomic gas treatment but was coated with the same printing ink, lacquer and india ink. These latter were the control specimens. Then both the control and the exposed samples were subjected to a manual scratch test to determine their resistance to removal of the coating. The coating-removal resistance of all samples was then rated by the tester as being unimproved, improved or greatly improved.

The printing ink employed for these tests was Excellobrite White 500. The lacquer was Duragloss Camelia. The india ink was Pelikan Waterproof Drawing Ink.

One group of the coated samples was exposed in the treating chamber to a stream of oxygen atoms, using a discharge current of 1 ampere at 1 kv., for one second. The rate of oxygen flow into the discharge chamber was $5 \times 10^{-3}$ moles per second. Another group of samples was exposed in a similar manner for 15 minutes. A third group of samples was left unexposed for purposes of comparison.

All of the samples was then given the scratch test. This consisted in rubbing a sharp pointed stylus back and forth across the coated surface trying to remove the coating. In the case of the unexposed samples, this type of test removed the coating in the abraded portion using just a few strokes. Adherence of the inks and the lacquer was very poor. But the exposed samples, even those which had been exposed for only one second, generally were rated excellent by the tester. Usually little difference could be detected in those samples exposed for only one second and those which had been exposed for 15 minutes. This indicates that the wettability of said surface is increased by said treatment.

The above test procedure was repeated using air as the gas instead of oxygen. The test results were generally the same as when oxygen was used.

The testing procedure was also repeated using nitrogen as the treating gas. The test results using nitrogen also were about the same as when oxygen was used.

A similar group of tests was also run on samples of polyethylene film and, for all three gases, adherence, as measured by the scratch test, was judged to be generally "greatly improved" compared to unexposed samples.

Although adherence problems are usually greatest in the case of non-polar films, other types of films were also tested to determine if adherence of inks and lacquers to these materials could be improved. For example, the polyesters such as polyethylene glycol terephthalate (Mylar) were put through a similar test as described above. The improvement was not as marked as in the case of the polyolefins, but, with only one second exposure to the monatomic streams, adherence was somewhat improved and, with longer periods of exposure, adherence was considerably improved.

Capran film (a polyamide) was also similarly tested and the results were about the same as for the polyester type of material.

In order to the test the effectiveness of the treatment in promoting the adherence of various materials to adhesives, groups of samples were given a peel strength test. In this test, specimens of various films and cloths were cut to ½ inch width and butt welded to ½ inch width "Scotch" brand No. 600 acetate tape. One of the free ends of the welded unit was secured to a fixed point and the other end was attached to a balance pan. The minimum force in g./inch required to peel apart the welded ends was obtained by successivle increase of weights upon the balance pan.

Films tested in one group of tests were the polyolefins, polypropylene and polyethylene, the polyester, Mylar, and the polyamide, Capran. Nylon (a polyamide) and Dacron (a polyester) cloths were also tested in this manner. Polypropylene adheres so well to the pressure sensitive tape without any treatment that treatment according to the method of the invention produced no significant improvement. But exposure to monatomic air, oxygen or nitrogen greatly improved the adherence properties of polyethylene. Untreated polyethylene film required about 356 g./inch force (on the average) to peel apart the ends of the welded sample. After only one second treatment with monatomic oxygen, an average of 420 g./inch was required to peel the films apart and, after 15 minutes treatment, the average force required was 1012 g./inch. After one second exposure to monatomic air, the force required to peel apart the weld was 492 g./inch on the average, and after 15 minutes exposure, the force required was 1140 g./inch. For monatomic nitrogen treatment, the corresponding figures were 588 g./inch and 1100 g./inch. Thus, the adherence properties of polyethylene film were greatly improved by even brief exposures to the monatomic gases under the conditions which have been described.

The polyester film, Mylar, was similarly tested. For the case of treatment with monatomic air, the resistance to peel increased about 2 and one-half times after 15 minutes treatment and increased to a lesser extent with shorter exposure times. The increase was somewhat greater when the films were exposed to monatomic oxygen and somewhat less when exposed to monatomic nitrogen. After one second exposure to monatomic oxygen, the Mylar welds improved about 40%, on the average, in peel strength, and one second exposure to monatomic air resulted in almost as great an increase.

Capran film responded to the treatment in a much more pronounced manner. After one second exposure to oxygen atoms, this type of film exhibited a four-fold increase in peel strength. One second exposure to air atoms nearly doubled the peel strength and a similar exposure to nitrogen atoms produced only slightly less improvement. Fifteen minute exposure to either monatomic air or nitrogen caused the peel strength to increase about six times and a similar exposure to oxygen produced over a seven-fold increase compared to unexposed film.

To determine whether cloths could have their adherence properties improved by the method of the invention, samples of Nylon and Dacron cloths were similarly prepared, and were given the same peel strength test as the film. Exposure to monatomic air, nitrogen and oxygen produced significant increases in peel strength in both these materials. Nylon, for example, increased about four times in peel strength after 15 minutes exposure to oxygen atoms and a similar effect was measured for nitrogen treatment. Dacron was improved about four-fold with oxygen treatment and over two-fold by treatment with monatomic nitrogen. With shorter exposure times the treatment produced correspondingly less effect.

Although it was found more difficult to obtain quantitative test data for exposure times less than one second, using the apparatus as described, it was determined that treating times as little as one-tenth of a second produced a significant improvement of the adherence properties of the materials tested. Hence it is possible to treat either films or cloths in continuous fashion as they are unwound from supply rolls and exposed for a brief period to a stream of the monatomic gases specified.

Apparatus for continuous treatment of long lengths of film or cloth is illustrated diagrammatically in FIG. 2. The apparatus of FIG. 2 includes a tubular-shaped discharge electrode 4, similar to that of FIG. 1, and a second discharge electrode 50 which is generally disc-shaped. Unlike the apparatus of FIG. 1, discharge electrode 50 has a central aperture 52 in the form of a narrow elongated slot. This is for the purpose of spreading the gaseous plasma jet over a greater width so that it can be used more effectively to treat films or cloths of commercial widths. In this form of apparatus, the treating chamber 22 contains two pairs of rollers or reels 54, 56 and 58, 60. The material being treated is unwound from reels 54 and 58 and re-wound on reels 56 and 60. The reels 56 and 60 may be driven by suitable means (not shown) such as magnetic coupling devices. The speed of travel of the films or cloths 62 and 64 over centrally disposed guide rollers 66 and 68 may be varied to provide the length of treatment desired. This will, of course, depend upon the material being treated and the effect desired.

Although the method has been illustrated as applied to films and cloths, it is readily apparent that it is equally applicable to treating objects of almost any shape. The article to be treated may be mounted on a spindle within the treating chamber and rotated either by hand or mechanically to expose the desired parts to the jet stream.

Quantitative testing data have been given with respect to a number of different synthetic resinous materials. But the method is also applicable to any other solid synthetic resinous material. Examples of such materials are the polyacrylates and methacrylates, polystyrenes, polyvinyls, urea-formaldehyde, phenol-formaldehyde, cumarones, cellulose ethers and esters, polyethers, polyacetals, and the like, as well as copolymers and derivatives thereof. Exposures to the jet stream of monatomic oxygen, nitrogen or air, or even a small fraction of a second duration, are enough to increase the adherence properties of these materials and longer exposures generally produce an increased effect.

There has thus been described an improved method of treating materials, particularly synthetic resinous materials, to increase their adherence properties. The treatment produces some modification of the surface of the material that is not entirely understood with respect to some of the materials although some degree of understanding has been arrived at in the case of the polyolefins, for example. This type of resin is a hydrocarbon and the carbon-hydrogen linkages at the surface are normally nonpolar. Treatment with monatomic gas stream, as described, apparently opens up some of the carbon-hydrogen linkages and oxidizes them to polar groups. This explanation obviously does not apply to many of the other resins mentioned.

The effect produced is not a transitory one. Exposed samples have been stored for weeks before giving them the scratch test or the peel strength test without any apparent weakening of the effects of the treatment.

What is claimed is:

1. A method of treating a surface of a synthetic resinous material selected from the class consisting of polyolefins, polyesters and polyamides to increase the wettability of said surface, comprising exposing said first-mentioned surface to a gaseous mixture including a monatomic gas selected from the class consisting of oxygen and nitrogen for at least a small fraction of a second, said exposure being in the absence of other forms of energy.

2. A method according to claim 1 in which said material is a synthetic resinous cloth.

3. A method according to claim 1 in which the adherence of said material to inks and lacquers is increased.

4. The method according to claim 1 wherein exposure to said monatomic gas is for from about 0.1 second to about 15 minutes.

5. A method of treating a surface of synthetic resinous material to increase the wettability thereof comprising passing a gaseous mixture including a monatomic gas selected from the class consisting of oxygen and nitrogen through an electrical discharge at 1 ampere and 1 kilovolt so as to convert a substantial proportion thereof to monatomic form, expanding the gas, which has been exposed to the discharge by passing it into an expansion chamber and treating a synthetic resinous surface with the expanded gas, said exposure being in the absence of other forms of energy.

6. A method of treating a surface of a polyolefin synthetic resinous material to impart polar properties to said surface and to thereby increase the wettability thereof, comprising exposing said surface to a gaseous mixture including a monatomic gas selected from the class consisting of oxygen, nitrogen and air for at least a small fraction of a second, said exposure being in the absence of other forms of energy.

7. A method of treating a surface of a material to increase the wettability thereof, comprising passing a gaseous mixture including a monatomic gas selected from the class consisting of oxygen and nitrogen through an electrical discharge so as to convert a substantial proportion thereof to monatomic form, and directing a stream of said monatomic gas against said surface for at least a small fraction of a second, said exposure being in the absence of other forms of energy.

8. A method of treating a surface of a material to increase the wettability thereof, comprising passing a gaseous mixture including a monatomic gas selected from the class consisting of oxygen and nitrogen through an electrical discharge so as to convert a substantial proportion thereof to monatomic form, forming a supersonic gaseous jet including said monatomic gas and directing said jet against said surface for at least a small fraction of a second, said exposure being in the absence of other forms of energy.

9. A method of treating a surface of a material to increase the wettability thereof, comprising passing a gaseous mixture including a monatomic gas selected from the class consisting of oxygen and nitrogen through a silent electrical discharge, forming a supersonic gaseous jet from the gas which has been subjected to the discharge and directing said jet against said surface, said exposure being in the absence of other forms of energy.

References Cited by the Examiner

UNITED STATES PATENTS

| | | | |
|---|---|---|---|
| 2,956,899 | 10/1960 | Cline | 117—47 |
| 3,029,121 | 4/1962 | Collins | 117—47 |
| 3,067,119 | 12/1962 | Ramaika | 204—165 |
| 3,081,214 | 3/1963 | Strome | 204—165 |
| 3,111,424 | 11/1963 | Le Clair | 117—47 |
| 3,250,638 | 5/1966 | Lassiter | 117—47 |

JOHN H. MACK, *Primary Examiner.*

R. K. MIHALEK, *Assistant Examiner.*